United States Patent Office 3,148,166
Patented Sept. 8, 1964

3,148,166
VINYL ALCOHOL POLYMER FILMS
Hideo Suzumura, Katsuaki Hirano, and Teiichiro Chiba, all of Kurashiki, Japan, assignors to Kurashiki Rayon Co., Ltd., Kurashiki-shi, Japan, a corporation of Japan
No Drawing. Filed Jan. 3, 1962, Ser. No. 164,162
Claims priority, application Japan Jan. 6, 1961
9 Claims. (Cl. 260—31.2)

This invention relates to improved water-soluble films of polyvinyl alcohol derivatives and is more particularly concerned with films of polyvinyl alcohol derivatives which have reduced tackiness and with methods of producing them.

Polyvinyl alcohol is soluble in hot water, but it is not generally soluble in cold, or even warm water. However, partially-saponified polyvinyl alcohols, sometimes referred to as partially-saponified polyvinyl esters, and other polyvinyl alcohol derivatives are known which are readily soluble in a short period of time in cold water or water at room temperature. Thus, these known water-soluble polyvinyl alcohol derivatives include polyvinyl alcohols which still contain acetic groups (partially-saponified polyvinyl acetate) and polyvinyl alcohols in which some of the hydroxyl groups have been replaced by other groups, viz. acetalized polyvinyl alcohol of a low degree of acetalization, urethanylated polyvinyl alcohol, oxyethylated polyvinyl alcohol, cyanoethylated polyvinyl alcohol, and the like. When such water-soluble polyvinyl alcohol derivatives are formed into films, such films have good water-solubility, and therefore, can be utilized for purposes for which water-soluble films are desired. However, these water-soluble films all have the drawback that they absorb moisture when exposed to high-humidity conditions and become tacky, so that they readily adhere to each other. This tackiness is highly undesirable and has presented a serious problem in the handling and use of such water-soluble films.

It is an object of this invention to provide water-soluble films of polyvinyl alcohol derivatives which do not exhibit undesirable tackiness.

It is a further object of the invention to provide a process for producing water-soluble films having little or no tackiness.

It is a further object of the invention to provide a method for suppressing tackiness in water-soluble films.

In accordance with the invention, the polyvinyl alcohol derivatives from which the water-soluble films are to be formed are combined, prior to being formed into films, with aliphatic dicarboxylic acids having less than 3% solubility in water at 20° C. but more than 0.3% solubility in water at 100° C. It has been discovered that such dicarboxylic acids are, surprisingly, highly effective in the prevention of tackiness, even under high-humidity conditions, without reducing the water solubility of the films. As is known, films are conventionally formed by standard techniques from solutions of water soluble polyvinyl alcohol derivatives in water or in mixed solvents composed of water-miscible organic solvents, such as alcohol or acetone, and water. In accordance with this invention, the dicarboxylic acid, which may be a saturated or an unsaturated acid, is added to the solution of the polyvinyl alcohol derivative at any time before the solution is formed into a film. The amount of aliphatic dicarboxylic acid added to provide the desired tackiness-preventing action without reducing the water-solubility of the film should be less than 30% by weight of the polyvinyl alcohol derivative, and preferably the amount added is 0.5% to 20% by weight.

The aliphatic dicarboxylic acid added in accordance with the invention separates out on the film surface after the film is formed, and the presence of the acid on the film surface prevents undesirable tackiness and interfilm adhesion. It has been confirmed by many experiments that this tackiness preventing action is far greater than is obtainable when tackiness-suppressing agents other than the aliphatic dicarboxylic acids defined above are added to the polymer solution which is subsequently formed into a film. Even when only a small amount of the aliphatic dicarboxylic acid added separates out on the film surface, it is nevertheless effective for the prevention of adhesion and tackiness and the separation on the film surface of dicarboxylic acids of the character described has been found to be entirely homogeneous. Accordingly, it is most advantageous to use less than 5% by weight of the dicarboxylic acid, based on the polyvinyl alcohol derivatives, and with such amounts there is no significant change in the outward appearance of the film. After the film has been formed, the aliphatic dicarboxylic acid gradually separates out on the film surface with the passage of time. Repeated moisture absorption and drying further promotes the separation toward the surface and, at the same time, makes the dicarboxylic acids more effective for the prevention of adhesion and tackiness. Subjecting the film surface to the well-known so-called "pear-skin texture"-producing process to provide a minute corrugation on the film surface, or adding conventional water-soluble plasticizers to the film-forming solution, is also effective in facilitating the surface separation of the dicarboxylic acids.

Examples of aliphatic dicarboxylic acids suitable for use in accordance with this invention are fumaric acid, adipic acid, azelaic acid, and sebacic acid.

The invention will be further understood from the following specific examples of practical application. However, it will be understood that these examples are not to be construed as limiting the scope of the present invention in any manner. In the examples, all parts are by weight unless otherwise indicated.

The peeling off resistance referred to in the following examples is the force required to peel off, i.e. separate ore delaminate, the film aggregate made from two sheets of the water-soluble film plied together, after allowing the aggregate to stand four days at 20° C. and 90% relative humidity and two days at 20° C. and under 65% relative humidity, in each case under a load of 100 g./cm².

*Example 1*

To a 10% aqueous solution of partially-saponified polyvinyl alcohol having an average degree of polymerization of 550 and a degree of saponification of 88 mol percent there was added 10% (based on the weight of the polyvinyl alcohol) of fumaric acid, and the solution was spread in conventional manner and air dried into a film. The film was then heated at 100° C. for 5 minutes in an atmosphere controlled to 90% relative humidity to cause the fumaric acid to separate out on the film surface. The resultant film, 0.02 mm. thick, exhibited no tackiness and dissolved in water at 20° C. in 20 seconds. In contrast, when fumaric acid was not added, the solubility of the film was the same, but the peeling off resistance was 110 g./cm.

*Example 2*

To a 13% aqueous solution of urethanyl polyvinyl alcohol having a degree of urethanylation of 4.3 mol percent, and produced by mixing 10% of urea with polyvinyl alcohol having an average degree of polymerization of 1700 and a degree of saponification of 98.0 mol percent, followed by heating the mixture at 190° C. for a few minutes, there was added 3% (based on the weight of the urethanyl polyvinyl alcohol) of fumaric acid. The solution was formed into a film of 0.02 mm. thickness by the drum casting process. The film surface was simultaneously subjected to the "pear-skin texture" process. The following table shows the performance characteristics of this film, compared with those of a film containing no dicarboxylic acid and of a film prepared as described above but not subjected to the "pear-skin texture" treatment.

|  | Urethanylated polyvinyl alcohol alone | Urethanylated polyvinyl alcohol to which was added 3% fumaric acid | Urethanylated polyvinyl alcohol to which was added 3% fumaric acid and the film subjected to the pear-skin texture treatment |
|---|---|---|---|
| Peeling-off resistance (g./cm.) | 105 | 16 | 0 |
| Dissolving time of film in water at 20° C. (seconds) | 40 | 40 | 40 |
| Tensile strength at 20° C. and 65% relative humidity (kg./mm.²) | 3.4 | 3.2 | 3.1 |

*Example 3*

An aqueous solution prepared by adding 5% of 1,3-butylene glycol and 15% of adipic acid to formalized polyvinyl alcohol having a degree of formalization of 20 mol percent and produced by reacting polyvinyl alcohol of an average degree of polymerization of 625 and a degree of saponification of 98.9 mol percent with formaldehyde at 90° C., using hydrochloric acid as the catalyst, was formed into a film by the drum casting process. In an atmosphere controlled to 90% relative humidity, the film was heated at 65° C. for 5 minutes and then cooled to room temperature and this treatment was repeated several times. The film obtained in this manner exhibited a peeling-off resistance of 10 g./cm. In contrast, the peeling-off resistance of a film formed from the formalized polyvinyl alcohol alone was 122 g./cm.

*Example 4*

To a film-forming aqueous solution of acetoacetalized polyvinyl alcohol of a degree of acetacetalization of 7 mol percent and produced by reacting polyvinyl alcohol having an average degree of polymerization of 625 and a degree of saponification of 99.0 mol percent acetaldehyde, using sulfuric acid as the catalyst, was added 5% of azelaic acid. The solution was formed into a film, while simultaneously subjecting it to the "pear-skin texture" process. The resultant film after being allowed to stand for one week exhibited a peeling-off resistance of 13 g./cm. In contrast, the peeling-off resistance of a film made from the same solution to which azelaic acid was not added was 105 g./cm.

*Example 5*

Sebacic acid in the amount of 7% was added to a film-forming aqueous solution of sulfacetalized polyvinyl alcohol of a degree of sulfacetalization of 6 mol percent produced by the reaction at 70° C. in aqueous solution of polyvinyl alcohol of an average degree of polymerization of 1100 and a degree of saponification of 99.5 mol percent, crotonic acid, sodium bisulfite, and sulfuric acid. The solution was formed into a film and the film was dried for 10 minutes at 105° C. After being left in an atmosphere controlled at 90% relative humidity, this film exhibited a peeling-off resistance of 27 g./cm. A film produced in the same way but without using sebacic acid, exhibited a peeling-off resistance of 230 g./cm. under the same conditions.

*Example 6*

Sebacic acid in the amount of 5% was added to a film-forming aqueous solution of cyanoethylated polyvinyl alcohol of a degree of cyanoethylation of 4 mol percent produced by the reaction of 30° C. in aqueous solution of polyvinyl alcohol of an average degree of polymerization of 500 and a degree of saponification of 98.5 mol percent, acrylonitrile and caustic soda. The solution was then formed into a film. This film exhibited a peeling-off resistance of 30 g./cm. The peeling-off resistance of a corresponding film containing no sebacic acid was 273 g./cm.

The conditions, components and relative relationships set forth in the examples are those preferred but it will be understood that other conditions, other components, and other relationships may be used within the scope of the invention. Thus, the invention is in no way limited in the provision of anti-tackiness agents to the dicarboxylic acids used in the examples. Other aliphatic carboxylic acids, whether saturated or unsaturated, which correspond to the above-specified solubility criteria, can be suitably used. The solubility characteristics of aliphatic dicarboxylic acids are known or can be readily determined by simple conventional routine test.

Similarly, water-soluble polyvinyl alcohol derivatives other than those referred to in the examples are suitably used in combination with the dicarboxylic acid anti-tackiness agents of this invention. Indeed, the invention is fully applicable to any polyvinyl alcohol derivatives which form water-soluble films.

Polyvinyl alcohol is a polymer containing hydroxyl groups and corresponding to the formula:

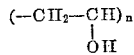

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterification, i.e. alcoholysis, in accordance with the following equation:

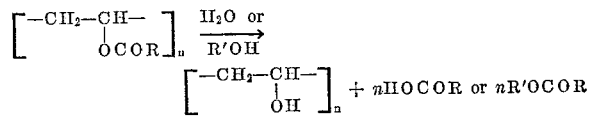

As previously indicated, cold-water solubility is a characteristic of polyvinyl alcohols produced in accordance with the foregoing equation in which only some of the acetic groups are replaced by hydroxyl groups (partially-hydrolyzed polyvinyl alcohol) or in which some of the hydroxyl groups are replaced by other groups which have a solubilizing action upon the molecule. In all cases the vinyl alcohol derivatives are vinyl alcohol polymers.

The partially-saponified or partially-esterified polyvinyl alcohol which can be used in accordance with this invention is produced by conventional techniques from polyvinyl esters, such as polyvinyl acetate, by known saponification procedures as described, for example, in Scott et al. U.S. Patent No. 2,266,996 and Bryant et al. U.S. Patent No. 2,668,809. As is known in the art, a "partially-saponified" polyvinyl alcohol is the product of the hydrolysis of a polyvinyl ester, e.g. polyvinyl acetate, in which less than all of the ester groups, e.g. acetate groups, have been converted to hydroxyl groups. As explained of Scott et al. 2,266,996, the saponification or hydrolysis reaction is stopped by neutralizing the catalyst when the desired percentage conversion has occurred. The partially-saponified polyvinyl alcohols which are suitably used in accordance with this invention are sufficiently saponified that at least about 80% of the ester groups have been converted into hydroxyl groups. The degree of polymerization of the polyvinyl alcohol may vary widely but is suitably at least about 500.

Similarly, other polyvinyl alcohol derivatives are produced in conventional manner by reacting fully or partially-saponified polyvinyl alcohol with various reactants which react with the hydroxyl group of the vinyl alcohol polymer unit. To form partially acetalized, e.g. formalized, polyvinyl alcohol, for example, acetalization is conveniently carried out in conventional manner in an aqueous solution containing 0.2–10% aldehyde, 5–20% sulfuric acid and 0–25% sodium sulfate or ammonium sulfate at temperatures of 40–80° C. for times ranging from a few minutes, e.g. 10 minutes, to several hours, e.g. 5 hours.

Mixed polymers of vinyl alcohol are similarly suitably produced in conventional manner by hydrolysis or saponification of a mixed polymer of a vinyl ester and another monomer. However, the formation of polyvinyl alcohol or of any vinyl alcohol-containing polymer, e.g. any polyvinyl alcohol derivative, forms no part of this invention and the invention is applicable to any vinyl alcohol polymer which forms a film which is soluble in water at room temperature. In general, these polymers contain at least about 80 percent hydroxyl groups, i.e. at most 25% of the hydroxyl groups of the vinyl alcohol units are replaced by other groups, as exemplified by the polyvinyl alcohol derivatives used in the foregoing examples.

The vinyl alcohol polymers which are combined with the anti-tackiness agents of this invention are suitably formed into films in conventional manner as described, for example, in Schnabel U.S. Patent 2,177,612 and in Izard et al. U.S. Patent 2,236,061 and Herrmann et al. U.S. Patent 2,837,770.

Similarly, the films may be subjected to conventional treatments known to the art, such as the "pear-skin texture" treatment referred to above. This treatment is described, for example, in British Patent No. 812,415.

Thus, in general, conventional operations and techniques are suitably employed, unless otherwise indicated, in putting the invention into practice.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A method of producing improved water-soluble films from a normally readily water-soluble polyvinyl alcohol derivative selected from the group consisting of partially saponified polyvinyl acetate, acetalized polyvinyl alcohol, urethanylated polyvinyl alcohol, oxyethylated polyvinyl alcohol, and cyanoethylated polyvinyl alcohol which comprises,
    forming a film consisting essentially of an aliphatic dicarboxylic acid and a normally readily water-soluble polyvinyl alcohol derivative selected from the group consisting of partially saponified polyvinyl acetate, acetalized polyvinyl alcohol, urethanylated polyvinyl alcohol, oxyethylated polyvinyl alcohol, and cyanoethylated polyvinyl alcohol,
    said aliphatic dicarboxylic acid having less than 3% solubility in water at 20° C. but more than 0.3% solubility in water at 100° C.,
    said formed film containing from 0.5% to 30% by weight of said aliphatic dicarboxylic acid based on the weight of said polyvinyl alcohol derivative in said formed film,
    heating said formed film at a temperature of 65° C. to 105° C. whereby free aliphatic dicarboxylic acid separates out on the film surface and remains on said film surface,
    said heat treated film, containing said free acid on said film surface, having the same water-solubility characteristics as a film prepared solely from said normally readily water-soluble polyvinyl alcohol derivative whereby said film having said free acid on said film surface dissolves rapidly in water at 20° C. within the same dissolving time as said film made solely from said normally readily water-soluble polyvinyl alcohol derivative.

2. A method according to claim 1 wherein the amount of said aliphatic dicarboxylic acid is from 0.5% to 20% by weight based on the weight of said polyvinyl alcohol derivative in said prepared film.

3. A method according to claim 1 wherein the amount of said aliphatic dicarboxylic acid is from 0.5% to 5% by weight based on the weight of said polyvinyl alcohol derivative in said prepared film.

4. A method according to claim 1 wherein said aliphatic dicarboxylic acid in said prepared film is selected from the group consisting of fumaric acid, adipic acid, azelaic acid, and sebacic acid.

5. A method of preparing improved water-soluble films from a normally readily water-soluble polyvinyl alcohol derivative selected from the group consisting of partially saponified polyvinyl acetate, acetalized polyvinyl alcohol, urethanylated polyvinyl alcohol, oxyethylated polyvinyl alcohol, and cyanoethylated polyvinyl alcohol, whereby the film surface properties are modified to prevent undesirable tackiness on said film surface and prevent adhesion of adjacent films which comprises,
    preparing a solution consisting essentially of an aliphatic dicarboxylic acid and a normally readily water-soluble polyvinyl alcohol derivative selected from the group consisting of partially saponified polyvinyl acetate, acetalized polyvinyl alcohol, urethanylated polyvinyl alcohol, oxyethylated polyvinyl alcohol, and cyanoethylated polyvinyl alcohol,
    said aliphatic dicarboxylic acid having less than 3% solubility in water at 20° C. but more than 0.3% solubility in water at 100° C.,
    said aliphatic dicarboxylic acid being present in said solution in an amount that is from 0.5% to 5% by weight based on the weight of said polyvinyl alcohol derivative in said solution,
    forming films from said prepared solution containing said aliphatic dicarboxylic acid and said polyvinyl alcohol derivative,
    heat treating said formed film at a temperature of 65° C. to 105° C. whereby free aliphatic dicarboxylic acid separates out on the film surface and remains on the film surface and whereby the presence of aliphatic dicarboxylic acid on said film surface prevents the development of undesirable tackiness and interfilm adhesion,
    said heat treated film, having said free acid on said film surface, having the same water solubility characteristics as a film prepared solely from said normally readily water-soluble polyvinyl alcohol derivative whereby said film having said free acid on said film surface dissolved rapidly in water at 20° C. and within the same dissolving time as a film prepared solely from said normally readily water-soluble polyvinyl alcohol derivative.

6. A method according to claim 5 wherein said time of heat treatment is 10 minutes.

7. An improved film of a normally readily water-soluble polyvinyl alcohol derivative selected from the group consisting of partially saponified polyvinyl acetate, acetalized polyvinyl alcohol, urethanylated polyvinyl alcohol, oxyethylated polyvinyl alcohol, and cyanoethylated polyvinyl alcohol consisting essentially of,
    an aliphatic dicarboxylic acid and a polyvinyl alcohol derivative selected from the group consisting of partially saponified polyvinyl acetate, acetalized polyvinyl alcohol, urethanylated polyvinyl alcohol, oxyethylated polyvinyl alcohol, and cyanoethylated polyvinyl alcohol,
    said improved film containing free dicarboxylic acid on said film surface whereby the presence of said free acid on said film surface prevents undesirable tackiness and interfilm adhesion,
    said improved film containing from 0.5% to 30% by weight of said aliphatic dicarboxylic acid and said aliphatic acid having less than 3% solubility in water at 20° C. but more than 0.3% solubility in water at 100° C., said improved film, having said free acid on said film surface, having the same water solubility characteristics as a film prepared solely from said normally readily water-soluble polyvinyl alcohol derivative whereby said film having said free acid on said film surface dissolves rapidly in water at 20° C. within the same dissolving time as a film prepared solely from said normally readily water-soluble polyvinyl alcohol derivative.

8. An improved film according to claim 7 wherein the amount of aliphatic dicarboxylic acid is from 0.5% to 5% by weight based on the weight of said polyvinyl alcohol derivative.

9. An improved film according to claim 7 wherein said aliphatic dicarboxylic acid is selected from the group consisting of fumaric acid, adipic acid, azelaic acid, and sebacic acid.

References Cited in the file of this patent
UNITED STATES PATENTS 2,169,250    Izard  ---------------- Aug. 15, 1939